United States Patent Office 3,125,539
Patented Mar. 17, 1964

3,125,539
CERAMIC CATALYST HAVING A FLAME SPRAYED COATING OF A PLATINUM FAMILY METAL
Ernest Douglas Teague, Welwyn Garden City, England, assignor to Norton Company, Worcester, Mass., a corporation of Massachusetts
No Drawing. Filed Dec. 12, 1958, Ser. No. 779,867
Claims priority, application Great Britain Dec. 16, 1957
4 Claims. (Cl. 252—455)

The invention relates to ceramic catalysts.. This application is based upon British complete specification No. 39,044, filed December 16, 1957. One object of the invention is to provide a catalytic article having a minimum of platinum per unit mass of the carrier. Another object is to provide catalytic articles which will waste little or no platinum in the event of early destruction of the carriers due to use in fast cycles at high temperatures. Another object is to provide catalytic articles for experimental use having a minimum of platinum whereby the experiments can be made at low expense. Another object of the invention is to provide a platinum catalyst that is only slightly volatile at high temperatures. Another object is to provide a platinum catalyst which remains active for a longer time than previous platinum catalysts without poisoning the reaction.

Other objects will be in part obvious or in part pointed out hereinafter.

In various chemical processes ceramic balls and short ceramic cylinders are used as catalyst carriers. These are porous and are impregnated with various catalysts, one kind for one process and another kind for another process and so on. I provide ceramic catalyst carriers and coat them with platinum family metal of superior characteristics. Platinum family metal is used for catalytic material in a number of chemical reactions. The platinum family is ruthenium, rhodium, palladium, osmium, iridium, and platinum. In a typical case the catalyst is mostly platinum with minor proportions of some of the other metals. In fact in most cases platinum will be taken as it occurs in nature which is usually better than 95% platinum with a minor portion of usually all of the other metals.

Catalysts carrying ceramic balls and cylinders are made in great quantities by manufacturers and are available on the market. They are made in various sizes from small ones, about 3/16" diameter in case of balls, up to 1" in diameter and there is no reason why they cannot be made smaller or larger. These manufacturers usually make the balls or cylinders without applying any catalyst which is applied by the customer.

Example I

Ceramic balls ½ inch in diameter are produced out of a mixture of clay and alumina with a total content of 90 percent $Al_2O_3$ to make them refractory. As these can be procured on the open market, I need not describe here the method of manufacture. They are fired under cone 16 conditions of firing to react the composition well. They are quite porous.

These balls are placed in a rotating container of the general shape of a hollow sphere with a large opening at one end which is rotated at an angle, for example, an angle of 45° to the vertical will do. This container can be made of any suitable metal and container of 3 feet inside diameter is satisfactory.

The quantity of balls to place in the container is not critical. It is better, however, not to have too many so that all of them will be coated as hereinafter described. My best estimate is that 300 of them of the size mentioned can be satisfactorily coated at one time in the container mentioned. The opening of the container should be large and unobstructed so that the metal spray gun can be held by the operator at the best position for satisfactory coating. Where to hold the gun will be known to any good operator.

The particular composition of this mixture of clay and alumina was, before firing, close to 85% alumina and the balance substantially all clay but having a large percentage of alumina to make the 90% $Al_2O_3$. The other material of the clay was mostly silica, $SiO_2$.

Using a metal spray gun which fuses, atomizes and sprays metal wire, the balls are now coated with platinum. In this example, platinum just as it occurs is used, namely, being mostly platinum with a minor portion of the other metals. A wire one eighth inch in diameter is used in the spray gun which is provided with a supply of oxygen and acetylene and a supply of a compressed air. At the nozzle of the gun the platinum wire is fused by the oxyacetylene flame and atomized and sprayed by the blast of compressed air. These metal spraying guns are well known in the art and there have been many patents on them, the original U.S. patent being apparently No. 1,100,602 to Erika Morf, patented June 16, 1914. This discloses a practical metal spraying gun. However, metal spraying guns can readily be obtained on the open market and many makes are available. The temperature of combusion of acetylene and oxygene is well above the melting point of platinum, which is 1773° C., and will melt any of the platinum family of metals. A modified gun has been used to fuse and to spray zirconia, which has a melting point of about 2700° C., which is the highest melting point of any of the metals of the platinum family listed herein. See U.S. Patent No. 2,707,691 to W. M. Wheildon, Jr., patented May 3, 1955.

Any thickness of coating can be applied to the balls to meet required specifications. As an illustrative example to give the best mode of the invention, in order to comply with the statute, a coating of .001" is applied.

As a container rotates, the balls are of course also rotated and, furthermore, each one travels through the mass so that every ball is in the upper layer at various times. Statistically, the spherical areas are coated with platinum but, statistically also, the depth of the coating will not be uniform, but this does not matter. A good speed of rotation of a 3 foot diameter container is 30 r.p.m. It is not necessary to heat the balls, in fact, it is preferable not to do so. This completes the disclosure for Example I.

Example II

I use truncated cylinders of the same mixture of clay and alumina, fired also under the cone 16 conditions, with an average diameter of one-fourth of an inch and an average length of the same. The end surfaces are inclined to the axis, one in one direction and the other in the other direction. The angle of the surfaces is about 80° to the axis.

These are placed in the same container and coated with platinum in the same way as described in Example I to produce a coating .0005". In this case the container should also be vibrated vertically through a distance of one inch at the rate of about 100 reciprocations per minute in order to cause the cylinders, which I will call pellets, to mix with each other to bring all of them to the top layer from time to time.

These catalytic pellets, which is a good generic name for them, coated with platinum achieve the advantages stated in the objects. They are especially good for experimental use since a minimum of platinum can be used to perform the experiment. If the conditions in use are so severe that the pellets are quickly destroyed little platinum is lost because little will be provided. The surface produced by flame spraying the metal is a rough globular surface providing a large area for catalysis but at the same time the particles are large enough so that little is lost by volatilization.

While I have described ceramic pellets made of 90% alumina, any fired ceramic pellet can be used for same purposes according to the invention. Neither the precise shape nor the size of the pellets is of any consequence to the invention since various shapes and sizes can be used in various catalytic processes.

By platinum family metal I include all of the platinum family metals listed and all alloys of them, pure platinum and platinum as it is found in nature and all varieties of commercial platinum. The coating of platinum family metal should be between .0001" and .010" thick. Its physical shape can only be described by saying that it is flame sprayed in situ. The coating can be produced by flame spraying powder or molten metal as well as by flame spraying wire. The coating is interlocked with the surface of the pellet which is rough. The coating is integral with the pellet.

In the preferred form of the invention the pellets are at least 80% $Al_2O_3$, the balance being ceramic material, which can be in part or in whole the same $Al_2O_3$. While I have described two sizes and two shapes of pellets, they can be of any size or shape that manufacturers care to make and customers care to buy. The shapes described are those which are now easy to make.

Although for most uses the coating of platinum family metal should be at least .0001" thick, for others any deposit of the metal at all will work as a catalyst for a short time.

It will thus be seen that there has been provided by this invention a ceramic catalyst in accordance with which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:
1. A ceramic catalyst consisting of a porous, catalytically inactive fired ceramic pellet containing at least 80% alumina and having a rough surface, and a coating thereon between .0001" and .010" thick of platinum family metal flame sprayed onto the pellet, said coating being interlocked with the surface of the pellet and integral with the pellet.

2. A ceramic catalyst according to claim 1 in which the pellet is at least 80% $Al_2O_3$, the balance being ceramic clay material.

3. A ceramic catalyst consisting of a porous, catalytically inactive fired ceramic pellet containing at least 80% alumina and having a rough surface, and a deposit thereon of platinum family metal flame sprayed onto the pellet, said deposit being integral with the pellet.

4. A ceramic catalyst according to claim 3 in which the pellet is at least 80% $Al_2O_3$, the balance being ceramic clay material.

References Cited in the file of this patent

UNITED STATES PATENTS

| | | |
|---|---|---|
| 1,902,630 | Fairchild | Mar. 21, 1933 |
| 2,733,161 | Lytton et al. | Jan. 31, 1956 |
| 2,742,437 | Houdry | Apr. 17, 1956 |
| 2,943,951 | Haglund | July 5, 1960 |
| 2,966,423 | Shichman | Dec. 27, 1960 |